Jan. 9, 1923.
J. F. JOHNSON.
AUTO STOP GOVERNOR.
FILED JUNE 22, 1920.
1,441,353
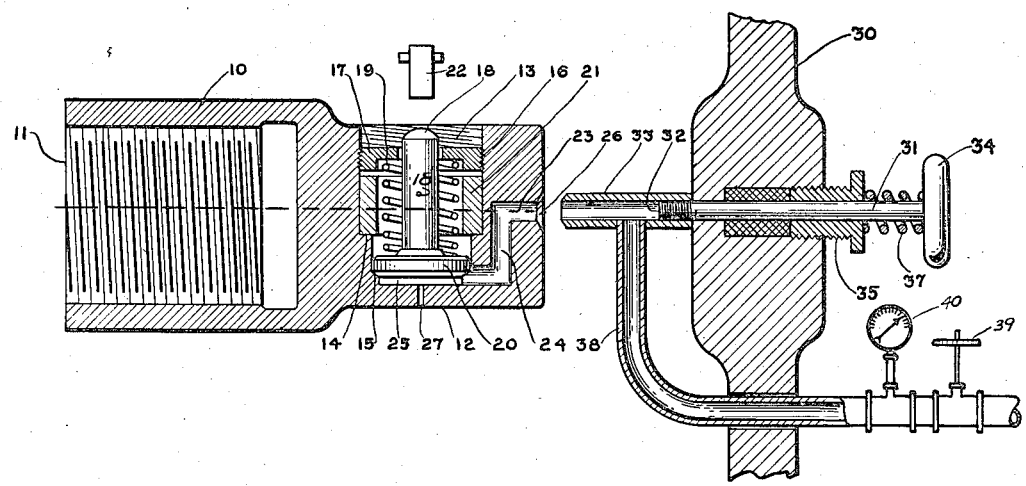
INVENTOR.
J.F.Johnson
BY D.C.Davis
ATTORNEY Patented Jan. 9, 1923.

1,441,353

UNITED STATES PATENT OFFICE.

JOSIAH F. JOHNSON, OF SWARTHMORE, PENNSYLVANIA, ASSIGNOR TO WESTING-HOUSE ELECTRIC & MANUFACTURING COMPANY, A CORPORATION OF PENNSYLVANIA.

AUTO STOP GOVERNOR.

Application filed June 22, 1920. Serial No. 390,783.

*To all whom it may concern:*

Be it known that I, JOSIAH F. JOHNSON, a citizen of the United States, and a resident of Swarthmore, in the county of Delaware and State of Pennsylvania, have invented a new and useful Improvement in Auto Stop Governors, of which the following is a specification.

My invention relates to improvements in governing mechanism for steam turbines, and more particularly to that class of governing mechanism employed to automatically shut off the steam supply to the turbine when a predetermined overspeed is reached.

The object of my invention is the provision of manually controlled means whereby the governor mechanism may be made to operate at a speed below that for which it is adjusted, so that the condition of operation of the mechanism may be readily determined, and is especially intended for the purpose of testing the mechanism at any desired time.

I attain these objects by the mechanism illustrated in the accompanying drawing, in which the figure shown is a sectional view through the turbine shaft and housing showing the details of the governing mechanism.

The overspeed governing mechanism, hereafter referred to as the auto-stop governor, is mounted in a cap 10 having a thread 11 so that it can be screwed onto the end of a turbine shaft. The cap 10 is provided with an extension 12 having a diametral recess 13 with two shoulders 14 and 15, the top of the recess being threaded at 16 to receive the retainer 17 which is provided with a guide opening in which the weight 18 may slide. The retainer 17 holds the spring 19 in place, and due to the threaded connection thereof to the recess, the tension of the spring 19 may be readily adjusted. The spring 19 also bears against piston 20 of the weight 18 to maintain the piston in contact with the shoulder 15. The collar 21 tightly fits in the recess 13 against the shoulder 14 and overhangs the latter in order to limit the travel of the piston 20. The weight 18 is thereby prevented from passing beyond the point necessary to trip the lever 22 which acts through a suitable mechanism to shut off the steam supply to the turbine. The weight 18 has its center of gravity, indicated, for example, at 18', arranged to one side of the axis of rotation of the rotor shaft so that it is responsive to centrifugal force to move out and trip the element 22 in the usual way.

An axial passage 23 in the end of the extension 12 of the cap 10 communicates through the passage 24 with the clearance space 25 below the piston 20 of the weight 18 and is chamfered at 26 to receive the nozzle of the oil supply mechanism to be described. The vent 27 is provided to permit the oil to escape from the clearance space 25.

In the housing or supporting means 30 adjacent to the member 12 is mounted a mechanism whereby oil or other suitable fluid under pressure may be introduced into the passage 23 and therefore to the clearance space 25 below piston 20. This mechanism consists of a rod 31 provided at one end with a screw thread 32 to receive the nozzle 33 and provided at the other end with a knob 34. The rod 31 is packed with reference to the casing 30 by means of a gland 35. The spring 37 is mounted on the rod 31 between the knob 34 and the gland nut and serves to keep the nozzle 33 in the disengaged position. The flexible tube 38, preferably made of copper, is connected near the end of nozzle 33 to supply the nozzle with fluid from some source of fluid supply under pressure, the supply being controlled by means of valve 39. A pressure gage 40 communicates with the tube 38 so that the pressure therein may be ascertained.

The main governor of a steam turbine may not always function properly, and in such a case it is desirable to have an automatic stop governor to shut off the steam supply in case the turbine acquires too high a speed. An auto-stop governor is generally designed to become effective at about 10% overspeed. If a turbine has been running at very nearly constant speed for a long time, and the main governor has been working properly, the auto-stop governor will not have been called upon to operate, and in such a case it is not uncommon for the auto-stop governor to get stuck which of course renders it practically useless. This might cause serious damage to the turbine on account of overspeeding.

In order to determine the working condition of the auto-stop governor, the testing mechanism has been devised as herein described. In order to test the auto-stop governor, it is simply necessary to press the knob 34 until the nozzle 33 engages the chamfered passage 26, and then turn the fluid under pressure on until sufficient pressure is built up in the clearance space 25 and acting against the piston 20 together with the centrifugal force acting on the weight 18 to cause the weight 18 to move out and trip the lever 22. When the auto-stop governor has been working properly a test will have been run to determine what fluid pressure is required to cause the auto-stop governor to become effective at normal operating speed. In conducting a test it is simply necessary to force the fluid into the governor at a pressure at which it should be effective at normal speed. If the governor operates to shut off the stem, the mechanism is in the proper condition, and if not the cause of the trouble must be investigated.

While I have shown my invention in but one form, it will be obvious to those skilled in the art that it is not so limited but is susceptible of various other changes and modifications, without departing from the spirit thereof and I desire, therefore, that only such limitations shall be placed thereupon as are imposed by the prior art or as are specifically set forth in the appended claims.

What I claim is:

1. An auto-stop governor for a rotor shaft comprising a trip element, an eccentrically weighted element carried by the rotor shaft and capable of moving out to engage the trip element, means cooperative with the weighted element to render the engagement of the weight element with the trip element responsive to a predetermined speed, and means capable of operation while the rotor shaft is rotating for applying pressure to the weight element to cause it to move out to engage the trip element at a speed below the said predetermined speed.

2. In combination with the adjustably-tensioned speed-responsive weight element of an auto-stop governor capable of moving to tripping position at a predetermined speed of a rotary element, manually controlled means operated while the rotary element is rotating for moving said weight element to tripping position at a speed less than said predetermined speed.

3. An auto-stop governor comprising a turbine-driven element, an eccentric weight carried by said element and capable of movement to a tripping position due to centrifugal force, adjustable means opposing motion of the weight due to centrifugal force to assure tripping at a predetermined speed, manually-controlled fluid pressure means cooperative with said weight to secure the movement thereof to tripping position at a speed below the predetermined speed, and a pressure gage cooperating with said pressure means to indicate the pressure required for tripping.

4. An auto-stop governor comprising a turbine-driven element having a recess with a piston chamber, an eccentric weight within the recess and capable of movement to a tripping position, adjustable means cooperating with said weight to assure the movement thereof to tripping position at a predetermined speed, said weight having a piston fitting within said piston chamber of the recess, manually-controlled fluid pressure means cooperative with the piston of said element to assure movement of the latter to tripping position at a speed less than the predetermined speed, and a pressure gage cooperative with said fluid pressure to indicate the pressure thereof.

5. An auto-stop governor comprising a turbine-driven element having a recess, an eccentric weight with a piston at one end fitting within the recess, spring means cooperating with said weight means and capable of adjustment to assure tripping at a predetermined rotational speed of said element, said element having a passage-way extending from beneath the piston and terminating axially of the turbine driven element, a fluid pressure nozzle adapted to be brought in cooperative relation with said passage-way, and pressure supply means for said nozzle.

6. An auto-stop governor comprising a turbine-driven element having a recess, an eccentric weight with a piston at one end fitting within the recess, spring means cooperating with said weight means and capable of adjustment to assure tripping at a predetermined rotational speed of said element, said element having a passage-way extending from beneath the piston and terminating axially of the turbine-driven element, a fluid pressure nozzle adapted to be brought in cooperative relation with said passage-way, pressure supply means for said nozzle, and a pressure gage connected with said supply means.

7. An auto-stop governor comprising a turbine-driven element having a recess including a piston chamber and a clearance space therebelow, an eccentric weight in said recess with a piston fitting the piston chamber of the recess, adjustable spring means cooperative with said piston to assure movement of said weight at a predetermined rotational speed of said element, said element having a passage-way communicating with said clearance space and terminating axially of the turbine-driven element, a nozzle alined with axial portion of said passage-way, means to move said nozzle into communication with said passage-way, a fluid pressure conduit connected to said nozzle, means controlling the passage of fluid therethrough, and a pressure gage in communication with said conduit.

8. An auto-stop governor comprising a turbine-driven element having a recess including a piston chamber and a clearance space therebelow, an eccentric weight in said recess with a piston fitting the piston chamber of the recess, adjustable spring means cooperative with said piston to assure movement of said weight at a predetermined rotational speed of said element, said element having a passage-way and relief port communicating with said clearance space, the passageway terminating axially of the turbine-driven element, a nozzle alined with the axial portion of said passage-way and adapted to be placed in communication therewith, a fluid pressure conduit connected to said nozzle, and means controlling the passage of fluid therethrough.

9. The combination of a rotary element, supporting means adjacent thereto, auto-stop tripping means carried by said element and responsive to centrifugal force, adjustable tension means associated with said tripping means to control tripping in accordance with the speed of rotation of the rotary element, said rotary element having a passage-way to supply fluid under pressure to act upon said auto-stop tripping means to assure tripping at a speed of rotation of the rotary turbine element less than that for which the tension means is adjusted, fluid pressure means carried by said supporting means, and means for bringing said fluid pressure means into communication with said passage-way.

10. The combination of a rotary element, supporting means adjacent thereto, auto-stop tripping means carried by said element and responsive to centrifugal force, adjustable tension means associated with said tripping means to control tripping in accordance with the speed of rotation of the rotary turbine element, said rotary element having a passage-way whereby fluid pressure may be used to assure tripping at a speed of rotation of the rotary element less than that for which the tension means is adjusted, fluid means including a nozzle adapted to be brought into cooperative engagement with said passage-way including a flexible tube, and means cooperating with said nozzle and carried by the supporting means for bringing the nozzle into engagement with the passage-way.

11. An auto-stop governor comprising a turbine-driven element, the turbine-driven element having a recess with shoulders and a threaded portion, a ring tightly fitting within the recess overlapping one of the shoulders and with the other shoulder defining a piston chamber, an elongated eccentric weight within the recess having a piston fitting the piston chamber and capable of motion to a tripping position, a spring surrounding the weight and bearing against the piston, a retaining ring threaded to the threaded portion of the recess and provided with a guide opening for said elongated weight, said ring being capable of adjustment to vary the tension of the spring and cause the weight to trip at a desired speed of rotation, said recess terminating in a clearance space beyond one shoulder, said element having a vent and passage-way communicating with said clearance space, and fluid pressure means adapted to be brought into cooperation with said passage-way whereby the eccentric weight may be caused to trip at a rotational speed less than that for which it was set.

12. The combination with an auto-stop device normally responsive to an overspeed of a rotating element for stopping it, of controllable means cooperative with the auto-stop device and capable of being operated while the shaft and auto-stop device are rotating to render the auto-stop device operative to stop the element at a speed below the overspeed.

13. The combination with an auto-stop device for a rotating element and including an eccentrically weighted element movable transversely of the axis of the rotating element to insure stoppage of the latter upon a predetermined overspeed, of means carried by the weight and capable of movement in response to fluid pressure, and manually-controlled means for supplying fluid under pressure to said first-named means to assure movement of the eccentrically weighted element at a speed below the predetermined overspeed.

14. In combination with a rotary element, auto-stop mechanism carried by said rotary element and including a weight adapted to move to tripping position to stop said rotary element upon a predetermined overspeed of the latter, a piston carried by said weight, and manually-controlled, fluid-pressure means cooperative with said piston to move the weight to tripping position at a speed below the predetermined overspeed.

15. In combination with a turbine-driven element, auto-stop mechanism carried by said element and including a weight adapted to move to a tripping position to operate mechanism to stop the turbine upon a predetermined overspeed, means carried by the weight and responsive to fluid pressure to assure movement of the weight to tripping position at a speed below a predetermined overspeed, and means for supplying fluid under pressure to the means carried by the weight while the turbine driven element is rotating.

In testimony whereof, I have hereunto subscribed my name this sixteenth day of June, 1920.

JOSIAH F. JOHNSON.